US010672201B2

(12) United States Patent
Calvert et al.

(10) Patent No.: US 10,672,201 B2
(45) Date of Patent: Jun. 2, 2020

(54) LOW-POWER WIRELESS FOR VEHICLE DIAGNOSTICS AND REPORTING

(71) Applicant: CenturyLink Intellectual Property LLC, Broomfield, CO (US)

(72) Inventors: Richard Calvert, Columbia, IL (US); Carlos Santiago, Aurora, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 16/048,626

(22) Filed: Jul. 30, 2018

(65) Prior Publication Data

US 2019/0188925 A1 Jun. 20, 2019

Related U.S. Application Data

(60) Provisional application No. 62/607,786, filed on Dec. 19, 2017.

(51) Int. Cl.
| | |
|---|---|
| *H02J 50/80* | (2016.01) |
| *G07C 5/00* | (2006.01) |
| *G07C 5/08* | (2006.01) |
| *H04W 4/80* | (2018.01) |
| *H04W 4/44* | (2018.01) |
| *H04W 12/08* | (2009.01) |
| *B60L 53/12* | (2019.01) |
| *B60L 53/65* | (2019.01) |
| *H02J 7/02* | (2016.01) |
| *H02J 50/00* | (2016.01) |
| *G07C 9/00* | (2020.01) |
| *H02J 7/00* | (2006.01) |

(52) U.S. Cl.
CPC .............. *G07C 5/008* (2013.01); *B60L 53/12* (2019.02); *B60L 53/65* (2019.02); *G07C 5/0808* (2013.01); *H04W 4/44* (2018.02); *H04W 4/80* (2018.02); *H04W 12/08* (2013.01); *B60L 2230/14* (2013.01); *B60L 2230/16* (2013.01); *G07C 2009/00928* (2013.01); *H02J 7/00034* (2020.01); *H02J 7/025* (2013.01); *H02J 50/00* (2016.02)

(58) Field of Classification Search
CPC combination set(s) only.
See application file for complete search history.

(56) References Cited

U.S. PATENT DOCUMENTS

| 9,379,780 B2 * | 6/2016 | Widmer ............... H04B 5/0037 |
| 10,069,962 B1 * | 9/2018 | Yau ........................ B60R 25/01 |
| 10,369,894 B2 * | 8/2019 | McCool ................. H04W 4/80 |

(Continued)

*Primary Examiner* — Cindy Trandai

(57) ABSTRACT

Novel tools and techniques for low-power wireless for vehicle diagnostics and reporting are provided. A system includes a wireless charging station, a diagnostic server, a network device, a low-power wireless device, and a low-power wireless transceiver. The network device may be in communication with the diagnostic server. The low-power wireless device may include a processor, and non-transitory computer readable media including instructions executable by the processor to establish a low-power wireless connection, obtain on-board information from the vehicle via the low-power wireless connection, transmit the on-board information to the diagnostic server, and receive a report from the diagnostic server based on the on-board information.

20 Claims, 8 Drawing Sheets

(56) References Cited

U.S. PATENT DOCUMENTS

| | | | |
|---|---|---|---|
| 2006/0055775 A1* | 3/2006 | Nou | G08G 1/0962 348/118 |
| 2006/0155717 A1* | 7/2006 | Davis | G07C 5/008 |
| 2006/0274700 A1* | 12/2006 | Janneteau | H04L 45/02 370/338 |
| 2007/0069976 A1* | 3/2007 | Willins | G02B 27/017 345/8 |
| 2010/0114686 A1* | 5/2010 | Carlson | G06Q 20/04 705/14.17 |
| 2010/0280675 A1* | 11/2010 | Tate, Jr. | H01M 10/44 700/295 |
| 2011/0021143 A1* | 1/2011 | Kapur | H04L 63/0464 455/41.2 |
| 2013/0110296 A1* | 5/2013 | Khoo | G06F 1/26 700/286 |
| 2013/0154358 A1* | 6/2013 | Kai | B60R 16/033 307/9.1 |
| 2013/0204485 A1* | 8/2013 | Chen | G06F 17/00 701/29.6 |
| 2013/0257364 A1* | 10/2013 | Redding | H02J 50/90 320/108 |
| 2013/0304583 A1* | 11/2013 | Han | G06Q 30/0267 705/14.64 |
| 2014/0155050 A1* | 6/2014 | Choi | H04W 4/21 455/418 |
| 2014/0375258 A1* | 12/2014 | Arkhipenkov | H02J 5/005 320/108 |
| 2015/0170439 A1* | 6/2015 | Chen | G07C 5/008 701/31.4 |
| 2015/0363986 A1* | 12/2015 | Hoyos | H05K 999/99 340/5.61 |
| 2015/0382085 A1* | 12/2015 | Lawrie-Fussey | H04Q 9/00 340/870.07 |
| 2016/0001656 A1* | 1/2016 | Korenaga | H01M 10/4207 701/22 |
| 2016/0234653 A1* | 8/2016 | Chu | H04W 4/33 |
| 2017/0075740 A1* | 3/2017 | Breaux | G06F 9/546 |
| 2017/0255228 A1* | 9/2017 | Yao | G06F 1/1637 |
| 2019/0248251 A1* | 8/2019 | Park | B60R 21/015 |

* cited by examiner

LOW-POWER WIRELESS FOR VEHICLE DIAGNOSTICS AND REPORTING

CROSS REFERENCE TO RELATED APPLICATIONS

This application claims priority to U.S. Provisional Patent Application Ser. No. 62/607,786 filed Dec. 19, 2017 by Richard Calvert et al., entitled "Wireless Charging Station On-Board Vehicle Diagnostic and Reporting," the entire disclosure of which is incorporated herein by reference in its entirety for all purposes.

This application may also be related to U.S. patent application Ser. No. 16/048,590, filed Jul. 30, 2018 by Richard Calvert et al., entitled "Low-Power Wireless for Access Control," the entire disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to low-power wireless systems, and more particularly to tools for providing low-power wireless solutions for secure access and access control applications.

BACKGROUND

Conventional physical access control and authorization functions utilize topologies in which a central controller may act as a hub for multiple readers. Alternatively, authorization may be provided locally at a reader or other access control device. Typically, users requesting access may present a physical credential (such as an access card, key fob, or other RFID or NFC-enabled credential), or other authorization information (such as biometric information including fingerprints, iris scans, retina scans, facial scans, voice recognition, hand scans, etc.) readable by a respective reader device. The authorization information is then checked against access list to determine whether access should be granted to a user.

As the internet-of-things (IoT) continues its development, increasingly more devices have become interconnected, providing flexibility to the types of functionality available on increasingly more types of devices. Typically, however, physical access control and authorization is either not performed on IoT devices, or rely on external authentication servers or services for logical access control to authorize use of a device or application. Similarly, typical access control devices (e.g., readers) are narrowly dedicated to their authorization functions.

Accordingly, tools and techniques for low-power wireless for secure access and access control applications are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
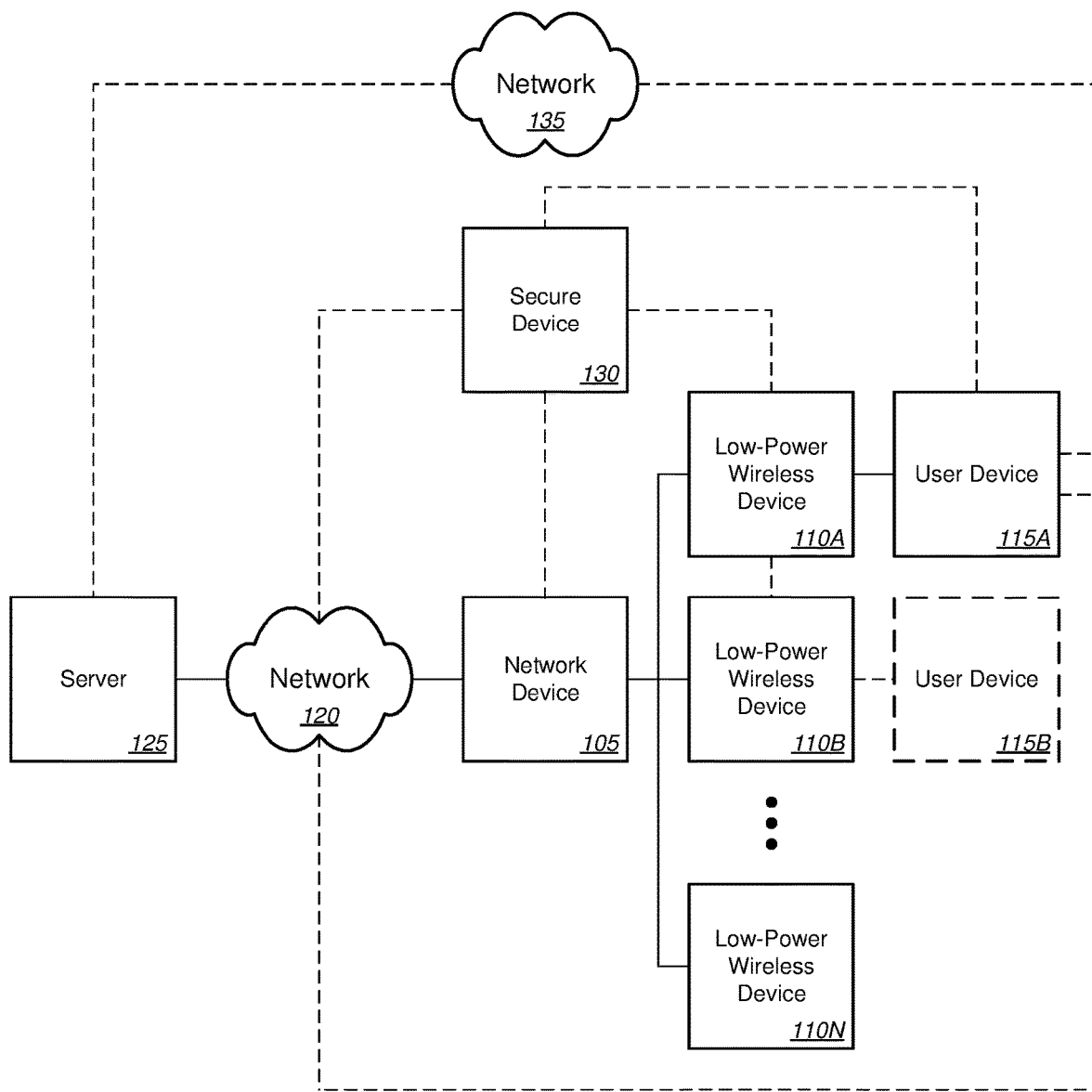
FIG. 1 is a schematic block diagram of a system for low-power wireless access control, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for low-power wireless for vehicle diagnostics and reporting is provided. The system includes a wireless charging station, a diagnostic server, network device, and low-power wireless device. The charging stations may be configured to charge a vehicle. The diagnostic server may be in communication with the network device. The low-power wireless device may further be in communication with the network device, and include a low-power wireless transceiver configured to communicate with an on-board low-power wireless transceiver of the vehicle. The low-power wireless transceiver may further include a processor, and non-transitory computer readable media comprising instructions executable by the processor to establish, via the low-power wireless transceiver, a low-power wireless connection with on-board low-power wireless transceiver, and obtain, via the low-power wireless connection, on-board information associated with the vehicle. The instructions may further be executable to transmit, via the network device, the on-board information to the diagnostic server, and receive, via the network device, a report from the diagnostic server based on the on-board information. The on-board low-power wireless transceiver may be configured to interface with the low-power wireless device, and to transmit on-board information associated with the vehicle.

In another aspect, an apparatus for low-power wireless for vehicle diagnostics and reporting is provided. The apparatus includes a low-power wireless transceiver configured to communicate with an on-board control unit of a vehicle, a processor, and non-transitory computer readable media comprising instructions. The instructions may be executable by the processor to establish, via the low-power wireless transceiver, a low-power wireless connection with the on-board control unit, and obtain, via the low-power wireless connection, on-board information associated with the vehicle. The instructions may further be executable by the processor to transmit, via a network device, the on-board information to a diagnostic server, and receive, via the network device, a report from the diagnostic server based on the on-board information. The instructions may further be executable by the processor to provide, via the low-power wireless connection, the report to be displayed.

In a further aspect, a method for low-power wireless for vehicle diagnostics and reporting is provided. The method may include establishing, via a low-power wireless device, a low-power wireless connection with an on-board control unit of a vehicle, and obtaining, via the low-power wireless device, on-board information associated with the vehicle over the low-power wireless connection. The method may further include transmitting, via the low-power wireless device, on-board information to a network device, and transmitting, via the network device, the on-board information to a diagnostic server. The method continues by receiving, via the network device, a report from the diagnostic server based on the on-board information, and adjusting, via the low-power wireless device, charging characteristic of a wireless charger based on at least one of the on-board information or the report.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a schematic block diagram of a system 100 for low-power wireless access control, in accordance with various embodiments. The system 100 includes a network device 105, low-power (LP) wireless devices 110A-110N (collectively "plurality of LP devices 110"), a first user device 115a, a second user device 115b, a first network 120, a server 125, a secure device 130, and a second network 135. It should be noted that the various components of the system 100 are schematically illustrated in FIG. 1, and that modifications to the system 100 may be possible in accordance with various embodiments.

In various embodiments, the network device 105 may be coupled to each of the plurality of LP wireless devices 110. Each of the plurality of LP wireless devices 110A-110N may be coupled to one or more respective user devices. For example, a first LP wireless device 110A may be coupled to a first user device 115A, and a second LP wireless device 110B may be coupled to a second user device 115B. A secure device 130 may be coupled to one or more of the network device 105, an LP wireless device, such as first LP wireless device 110, or a user device, such as the first user device 115A. The network device 105 may further be coupled, via the first network 120, to a server 125. The server 125 may further be coupled to one or more of the user devices, such as the first user device 115A. In some embodiments, the server 125 may be coupled to the first user device 115A via a second network 135. In other embodiments, the server may be coupled to the user device 115A via the first network 120. In further embodiments, the secure device 130 may be coupled to the first network 120. The first network 120 may be any type of communication network, including, without limitation, a wide-area network (WAN), a wireless wide area network (WWAN), a virtual network, such as a virtual private network (VPN), the Internet, a local area network (LAN), an intranet, an extranet, a public switched telephone network (PSTN), an infra-red (IR) network, or a wireless network including a cellular network.

The network device 105 may be a device used to facilitate communications between devices over one or more networks. For example, the network device 105 may include, without limitation, a residential gateway, modem, router, access point, network bridge, switch, hub, or repeater. In various embodiments, one or more of the LP wireless devices 110A-110N may be coupled to the network device 105. In various embodiments, the network device 105 may be configured to allow communication by the one or more of the LP wireless devices 110A-110N over an external network, such as network 120. For example, in some embodiments, the network device 105 may be configured to allow one or more of the LP wireless devices 110A-110N to communicate with a server 125.

The network device 105 may further be configured to be coupled to each of a secure device 130 and/or one or more user devices 115A, 115B. Thus, the network device 105 may further enable communications between the secure device 130 and one or more LP wireless devices 110A-110N, between the secure device 130 and one or more user devices 115A, 115B, between the secure device 130 and server 125 via the network 120, or between the one or more user devices 115A, 115B and the server 125 via the network 120.

In various embodiments, the network device 105 may be coupled to one or more of the devices via a wired or wireless connection. For example, in some embodiments, the LP wireless devices 110A-110N may be coupled to the network device 105 through various wired communication media and protocols, including, without limitation, powerline communications (PLC) (e.g., G·hn, HomePlug, etc.), Ethernet and other twisted pair networks, fiber optic networks, and coaxial networks. In further embodiments, the network device 105 may be coupled to the LP wireless devices 110A-110N via a wireless connection operating under any of the IEEE 802.11 suite of protocols, the Bluetooth™ protocol (including Bluetooth Low Energy (LE)), the Z-Wave protocol known in the art, the ZigBee protocol or other IEEE 802.15.4 suite of protocols known in the art, low-power wide area network (LPWAN) protocols, such as long range wide area network (LoRaWAN), narrowband IoT (NB-IoT); long term evolution (LTE); Neul; Sigfox; Ingenu; IPv6 over low-power wireless personal area network (6LoWPAN); low power Wi-Fi; cellular communications (e.g., 2G, 3G, 4G, 5G & LTE); Z-wave; Thread; near field communications (NFC); radio frequency identification (RFID); and/or any other wireless protocol; and/or any combination of these and/or other networks. Accordingly, in various embodiments, one or both low-power and non-low-power wireless communication protocols may be utilized between the LP wireless devices to the network device 105.

In various embodiments, each of the LP wireless devices 110A-110N may, in turn, be coupled to one or more respective user devices. For example, a first LP wireless device 110A may be coupled to a first user device 115A, and the second LP wireless device 110B may be coupled to a second user device 115B. In various embodiments, each of the LP wireless devices 110A-110N may be configured to establish a low-power wireless connection with the respective one or more user devices 110A-110N. User devices 110A-110N may include, without limitation, a wireless device, a mobile phone, smart phone, tablet computer, laptop computer, a vehicle, an electronic control unit for a vehicle, or other suitable device. In some embodiments, the user devices 110A-110N may be transportable by a user.

In various embodiments, low-power wireless connections may include wireless connections utilizing LPWAN and other low-power communication protocols. LPWAN communication protocols may include, without limitation, chirp spread spectrum (CSS) based protocols (e.g., LoRa and long range wide area network LoRaWAN); ultra narrowband (UNB) based protocols (e.g., narrowband IoT (NB-IoT)) including Neul, Sigfox, and Ingenu; long term evolution (LTE); IPv6 over low-power wireless personal area network (6LoWPAN) protocols (e.g., Thread, etc.); low power Wi-Fi; Zigbee; Z-wave; and Bluetooth LE. Accordingly, in various embodiments, each of the LP wireless devices 110A-110N and user devices 115A, 115B may include a respective low-power radio (LPR), which may include a low-power receiver, transmitter, or transceiver.

In various embodiments, each of the LP wireless devices 110A-110N may be coupled to one or more respective secure devices. For example, in system 100, the first LP wireless device 110A may be coupled to the secure device 130. In some embodiments, the first LP wireless device 110A may be coupled to the secure device 130 via a wired or wireless connection, as previously described with respect to wired and wireless connections between the network device 105 and the plurality of LP wireless devices 110. In some embodiments, the secure device 130 may comprise one or more LPRs in the form of one or more LP wireless devices 110A-110N. In one example, the secure device 130 may include the first LP wireless device 110A. Accordingly, each of the plurality of LP wireless devices 110 may include hardware, software, or both hardware and software. For example, the LP wireless devices 110A-110N may include a computer system including a processor (such as a microcontroller, ARM controller, one or more microprocessors, etc.) and system memory configured to store various program instructions for performing various functions described herein. In further embodiments, the LP wireless devices 110A-110N may be implemented as part of a field programmable gate array (FPGA), application specific integrated circuit (ASIC), system on a chip (SoC), microcontroller (MCU), single board computers such as Arduino, Raspberry Pi, etc., and other embedded solutions.

In various embodiments, each of the plurality of LP wireless devices 110 may be configured to receive, via a low-power wireless connection with a user device 115A, 115B, authorization information associated with the user of a respective user device 115A, 115B. Authorization information may include information indicative of a user being authorized to access a secure function, or authentication information used to determine whether the user is authorized to access a secure function. Accordingly, authorization information may include, without limitation, a unique identifier, username, password, personal identification number (PIN), an encrypted alphanumeric code or message (e.g., public-key encryption), digital rights management (DRM) information, other security credentials, or a combination of the above. In some examples, authorization information may include, without limitation, a fingerprint, facial scan or picture, iris scan, or other biometric information that may be taken by the user device 115A, 115B, and transmitted to a respective LP wireless device 110A-110N. In further examples, authorization information may include a token for token-based authorization. For example, in some embodiments, the user device 115A, 115B may be configured to generate a token (e.g., access token) based on successful authentication of a user by the user device 115A, 115B, and providing the token to the respective LP wireless device 110A-110N. Thus, the user may provide the user device 115A, 115B with authentication information, which may then be used to generate an access token or other authorization information (e.g., an encrypted command or message to access the secure function). In yet further embodiments, the authorization information may include payment information of a user, in which payment may be made to access one or more secure functions.

Once received by a respective LP wireless device 110A-110N, the LP wireless device 110A-110N may be configured to transmit the authorization information, via the network device 105, to the server 125. In various embodiments, the server 125 may then determine whether the user is authorized to access the secure function of a secure device 130. The server 125 may include, without limitation, an access control server, authentication server, authorization server, DRM server, application server, or controller. In some embodiments, the server 125 may be configured to authenticate a user based on the authorization information. In some examples, this may include comparing authentication information (provided as part of the authorization information) against an access list or user database. In some examples, authentication information may further include biometric information, which may be authenticated against a user database storing biometric information associated with a user base. In some embodiments, the server 125 may be configured to receive payment information as part of the authorization information. The server 125 may be configured to use the payment information to process a payment, either directly at the server 125 or using an external payment processing system. If the payment is successful, the server 125 may then authorize a secure function to be accessed.

Accordingly, in various embodiments, after the server 125 determines whether a user has been authorized, the server 125 may generate an access determination based on the authorization information provided by the user device 115A, 115B. Accordingly, the access determination may be indicative of whether the user of the user device is or is not authorized to access the secure function.

In various embodiments, before, after, or concurrently with an access determination by the server 125, the server 125 may further generate a secondary authorization request. The server 125 may be configured to send the secondary authorization request directly to the user device 115A, 115B associated with the authorization information, an account (e.g., an e-mail address or an account with a service provider) associated with the user and/or the authorization information, or a different device from the user device 115A, 115B associated with the user and/or the authorization information. Accordingly, in one example, the server 125 may be configured to transmit the secondary authorization request directly to the first user device 115A. In some embodiments, to transmit the secondary authorization to the first user device 115A, the server 125 may be coupled to the first user device 115A via a second network 135. For example, the first user device 115A may be a mobile phone. Thus, the second network 135 may be a cellular network through which the user device 115A may communicate. The server 125 may, therefore, transmit the secondary authorization to the first user device 115A via the cellular network. The secondary authorization, for example, may include a short message service (SMS) message, multimedia messaging service (MMS) message, voice call, video call, or an app-based notification (e.g., a notification pushed to the first user device 115A via an application), requesting secondary authorization from the first user device 115A. In other embodiments, the first user device 115A may also be coupled to the network device 105, and accessible via the first network 120. For example, the network device 105 may be a wireless access point to which the first user device 115A may be connected to the first network 120. Thus, the server 125 may transmit a message or a notification (of the secondary authorization request) to the first user device 115A via the network device 105. In yet further embodiments, the secondary authorization request may be sent, by the server 125, as a message to a known account associated with a user of the first user device 115A, such as an e-mail address.

In response to receiving the secondary authorization request, the respective user device 115A, 115B may be configured to generate and transmit a secondary authorization confirmation responsive to the secondary authorization request. The secondary authorization confirmation may indicate whether a request to access the secure function is a valid request that should be allowed or prevented. Thus, for example, if a user associated with the first user device 115A wishes to proceed to gain access to the secure function, a secondary authorization confirmation may be generated to confirm that the request is valid. If the user does not recognize the request to access the secure function, a secondary authorization confirmation may be generated to confirm that the request is invalid and should not be approved. If the secondary authorization confirmation indicates that the request is invalid, the server 125 may modify the access determination to prevent or cancel access to the secure function of the secure device 130.

In various embodiments, the server 125 may transmit the access determination to the respective LP wireless device 110A-110N, via the network device 105. For example, in various embodiments, the first LP wireless device 110A may receive an access determination for a user associated with the first user device 115A. The first LP wireless device 110A may, therefore, determine, based on the access determination, whether access to a secure function of the secure device 130 should be given to the first user device 115A. A secure function may include any function or operation that may be restricted from being accessed by unauthorized users. For example, a secure function may include, without limitation, locking or unlocking a lock (e.g., on a door or object, vehicle, window, etc.), locking or unlocking an application or other logical function for use by a user, dispensing of a physical object (e.g., a prepaid card, physical tokens, subscriber identification module (SIM) card, electronic device, mobile phone, toy, etc.), initializing an operation of a device (e.g., powering a charger for an electronic vehicle or an electronic device, controlling a light, controlling a thermostat, controlling a sprinkler system, controlling a garage or gate opener, printing an object via a printing device such as a 3-D printer or ink-based printer, allowing a telephone or video call to be placed, etc.). Thus, in various embodiments, the secure device 130 may correspond to the secure functions. For example, the secure device 130 may include, without limitation, a door lock, deadbolt, pad lock, window lock, a vending machine, a charger or charger station, a vehicle charging station, a power outlet, light bulb, thermostat, sprinkler system, HVAC system, garage opener, gate opener, printing device such as a 3-D printer or ink printer, a camera and/or microphone, telephone, or any other types of devices suitable for implementing a desired secure function. Accordingly, in various embodiments, the LP wireless device 110A may cause the secure function to be performed by the secure device 130 based on the access determination.

Figure 2:
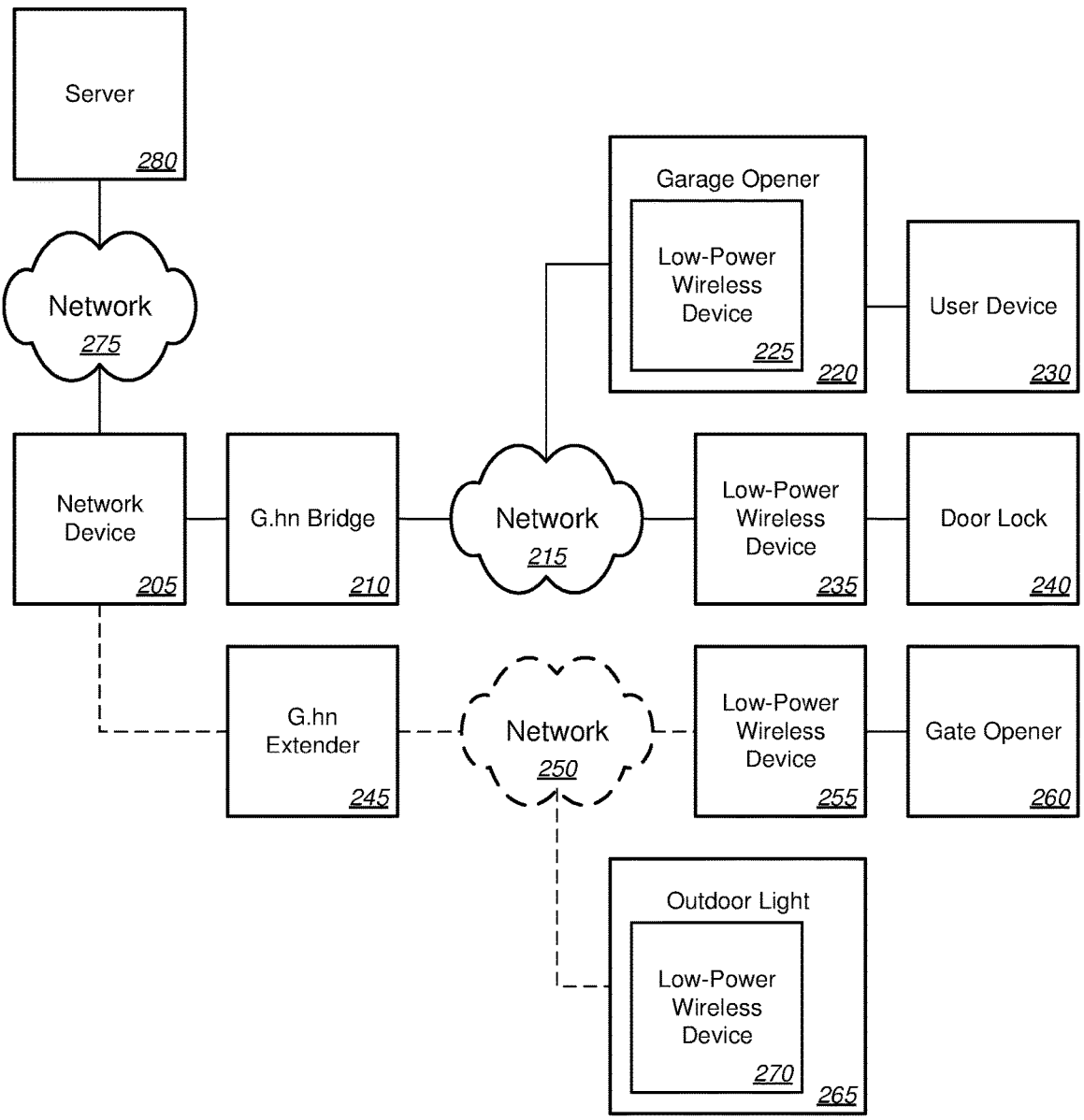
FIG. 2 is a schematic block diagram of an alternative arrangement for a system for low-power wireless access control, in accordance with various embodiments.

FIG. 2 is a schematic block diagram of an alternative arrangement for a system 200 for low-power wireless access control, in accordance with various embodiments. The system 200 includes a network device 205, a G·hn bridge 210, a first network 215, garage opener 220, a first LP wireless device 225, user device 230, a second LP wireless device 235, door lock 240, a G·hn extender 245, a second network 250, a third LP wireless device 255, a gate opener 260, an outdoor light 265, a fourth LP wireless device 270, a third network 275, and a server 280. It should be noted that the various components of the system 200 are schematically illustrated in FIG. 2, and that modifications to the system 200 may be possible in accordance with various embodiments.

In various embodiments, a PLC topology is utilized to couple a network device 205 to multiple LP wireless devices 225, 235, 255, 270. For example, the network device 205 may be coupled to a G·hn bridge 210, which in turn is coupled, via a first network 215, to a garage opener 220 having a first LP wireless device 225, and a second LP wireless device 235. The first LP wireless device 225 of the garage opener 220 may be coupled to the user device 230. The second LP wireless device 235 may be coupled to a door lock 240. The network device 205 may further be coupled to a G·hn extender 245, which in turn may be coupled, via a second network 250, to a third LP wireless device 255 and an outdoor light 265 having a fourth LP wireless device 270. The third LP wireless device 255 may be coupled to the gate opener 260.

In the PLC topology, in a set of embodiments, the first network 215 may belong to a first powerline circuit. For example, each of the garage opener 220, first LP wireless device 225, second LP wireless device, and door lock 240 may be configured to receive power from a common power circuit. The common power circuit may additionally be configured to carry signals for PLC. In some embodiments, the first network 215 may be a residential power circuit. Thus, in various embodiments, the network device 205 may be coupled to the first network 215 via a G·hn bridge 210 (or other G·hn network adapter). The G·hn bridge 210 may be configured to be coupled to the network device 205. For example, in some embodiments, the network device 205 may be coupled to the G·hn bridge 210 via an Ethernet, USB, or other type of wired connection. The G·hn bridge 210 may be configured to encode network signals into signals to be carried over a power lines, such as the electrical wiring of a customer premises, of the first network 215, and to decode network signals received from the first network 215 to be transmitted to the network device 205. Accordingly, the first LP wireless device 225 and second LP wireless device 235 may include a G·hn adapter, configured to separate and decode the network signals from the power signal. In other embodiments, the LP wireless devices 225, 235 may be coupled to a respective external G·hn adapter (not shown).

Similarly, the network device 205 may be coupled to a G·hn extender 245 in situations in which a wired connection to the network device 205 may not be practical, or in which a devices on a different power circuit may need to be connected to the network device 205. For example, the network device 205 may support a wireless connection via Wi-Fi (e.g., the IEEE 802.11 family of protocols), and the G·hn extender 245 may be coupled to the network device 205 via a Wi-Fi connection. Like the G·hn Bridge 210, in various embodiments, the G·hn extender 245 may also be configured to function as a network bridge, encoding and transmitting data signals from the network device 205 over the second network 250, and signals obtained from the second network 250 into a wireless signal to be transmitted to the network device 205.

In various embodiments, the network device 205 may further be configured to transmit signals, received from the various LP wireless devices 225, 235, 255, 270, via external network 275, to a server 280. As previously described with respect to FIG. 1, the external network 275 may be an external communications network, such as a service provider network, a WAN, the Internet, a virtual network, such as a VPN, a PSTN, a cellular network or the like. Thus, the network device 205 may be configured to communicate with a remote server, such as server 280, accessible over the external network 275.

In a set of embodiments, a user of the user device 230 may wish to open a garage door. Thus, a low-power wireless connection may be established between the first LP wireless device 225 of the garage opener 220, and the user device 230. The user device 230 may be configured to transmit authorization information, via the low-power wireless connection, to the first LP wireless device 225. In some embodiments, the user device 230 may be configured to prompt a user to provide authorization information, for example, a username and password, biometric information, etc. In other embodiments, authorization information may be stored on the user device 230 (e.g., user credentials, a token, payment information, etc.). The first LP wireless device 225 may, thus, be configured to transmit the authorization information received, over the low-power wireless connection, to the network device 205. In some examples, the first LP wireless device 225 may transmit the authorization information over powerline, via network 215, to a G·hn bridge 210, which then transmits the authorization information to the network device 205.

In turn, according to various embodiments, the network device 205 may transmit the authorization information to the server 280 via external network 275. The server 280 may, in turn, determine whether access should be granted to the user device 230 based on the authorization information, and generate an access determination indicative of whether access should be granted. The access determination may be transmitted, from the server 280, to the first LP wireless device 225, via the network device 205. For example, in some embodiments, the server 280 may transmit the access determination, via the external network 275, to the network device 205. The network device 205 may then transmit, via the first network 215, the access determination to the first LP wireless device 225. The first LP wireless device 225 may then determine, based on the access determination, whether to cause the garage opener 220 to open the garage door. Thus, in some embodiments, the secure function of the garage opener 220 may be opening and/or closing the garage door.

In other embodiments, each respective LP wireless device 225, 235, 255, 270 may be coupled to a respective secure device for performing a respective secure function. For example, a second LP wireless device 235 may be coupled to a door lock 240. The user device 230 may, in some examples, may similarly establish a low-power wireless connection with the second LP wireless device 235, and transmit authorization information to the second LP wireless device 235 via the low-power wireless connection. The second LP wireless device 235 may, similarly, transmit the authorization information to the network device 205, via the first network 215. The network device 205 may, in turn, transmit the authorization information to the server 280 via the external network 275. The server 280 may, then generate an access determination based on the authorization information indicative of whether access to the secure function should be granted. The server 280 may then transmit the access determination back to the second LP wireless device 235 via the first network 215. The second LP wireless device may then determine whether to cause the door lock to become unlocked or locked. Thus, the secure function of the door lock 240, associated with the second LP wireless device 235, may be unlocking or locking a door.

In another example, the third LP wireless device 255 may be coupled to a gate opener 260. In some embodiments, the gate opener 260 and/or third LP wireless device 255 may be coupled to a different power circuit (e.g., a separate branch circuit), or beyond a maximum range for G·hn communications. Thus, in some embodiments, the G·hn extender 245 may be coupled to the network device 205, to allow the network device 205 to communicate over the second network 250. The G·hn extender 245 may thus couple the network device 205 to the third LP wireless device 255 via the second network 250. Similarly, the outdoor light 265, which may include the fourth LP wireless device 270, may be coupled to the network device 205 via the second network 250. Accordingly, authorization information may be sent, via the third or fourth LP wireless device 255, 270, to the G·hn extender 245, via the second network 250. The G·hn extender 245 may be configured to transmit the authorization information to the network device 205. The network device 205 may, in turn, transmit the authorization to the server 280 via the external network 275.

Similarly, an access determination from the server 280 may be transmitted to the third or fourth LP wireless device 255, 270 by the network device 205, via the G·hn extender 245, and over the second network 250. The third LP wireless device 255 may be configured to cause the gate opener 260 to open or close a gate, based on the access determination. The fourth LP wireless device 270 may be configured to cause the outdoor light 265 to turn on or off based on the access determination. Accordingly, in some embodiments, the user device 230 may be used to authorize a user to access and control each of a garage opener 220, door lock 240, gate opener 260, and outdoor light 265 via respective LP wireless devices 225, 235, 255, 270.

Figure 3:
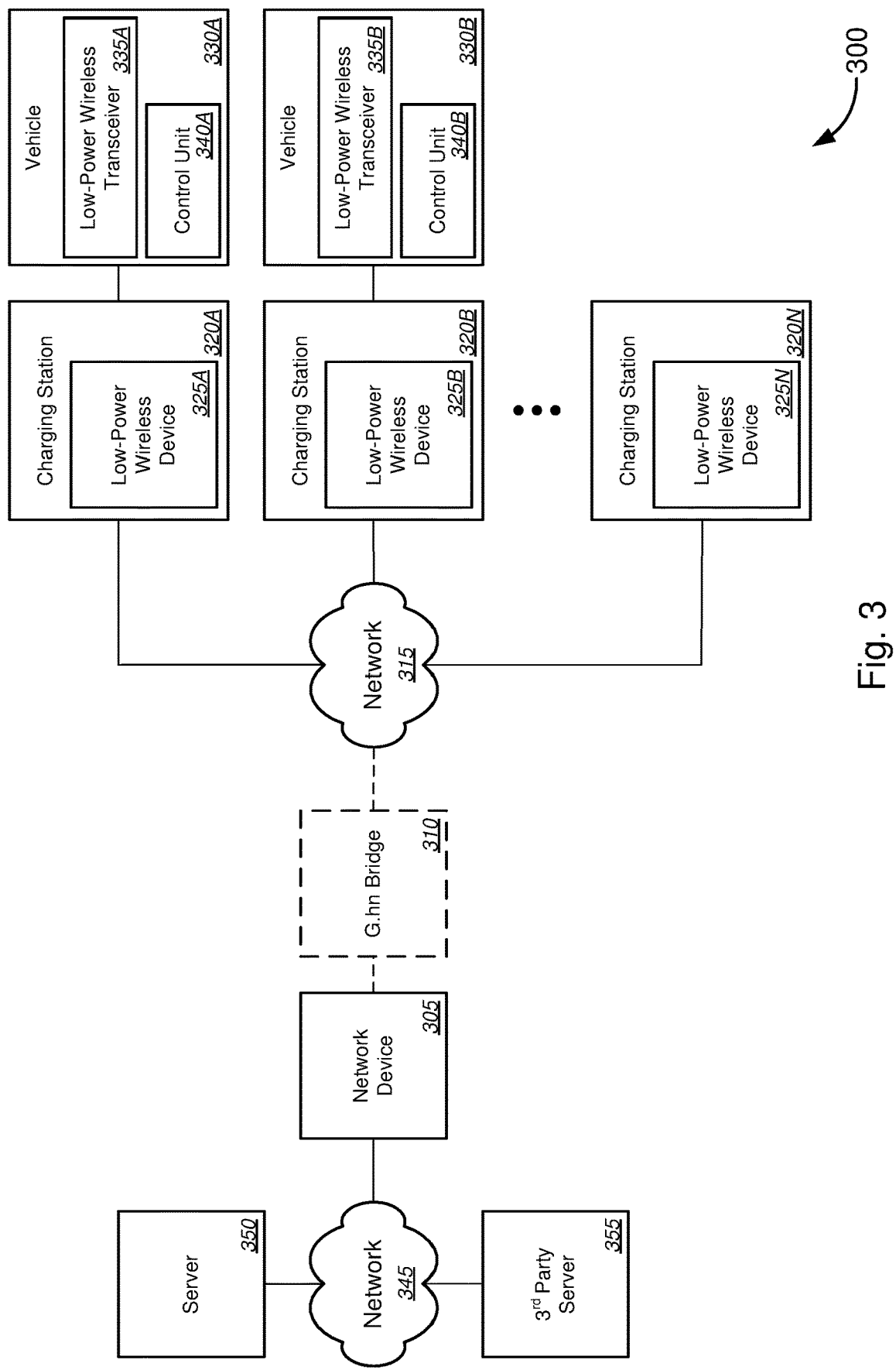
FIG. 3 is a schematic block diagram of a system for low-power wireless vehicle diagnostics and reporting, in accordance with various embodiments.

In further examples, LP wireless connections may be used to control access to different types of secure functions. FIG. 3 is a schematic block diagram of a system 300 for low-power wireless vehicle diagnostics and reporting, in accordance with various embodiments. The system 300 includes a network device 305, G·hn bridge 310, a first network 315, charging stations 320A-320N (collectively "plurality of charging stations 320"), LP wireless devices 325A-325N (collectively "plurality of LP wireless devices 325"), a first vehicle 330A having a first LP wireless transceiver 335A and a first control unit 340A, a second vehicle 330B having a second LP wireless transceiver 335B and a second control unit 340B, a second network 345, a server 350, and a third-party server 355. It should be noted that the various components of the system 300 are schematically illustrated in FIG. 3, and that modifications to the system 300 may be possible in accordance with various embodiments.

The system 300 depicts an example of a topology for a charging station. The network device 305 may be coupled to one or more LP wireless devices 325A-325N of one or more respective charging stations 320A-320N, via the network 315. In some embodiments, the network device 305 may be coupled to the network 315 via a G·hn bridge 310. In some embodiments, the charging stations 320A-320N may be vehicle charging stations for electric vehicles. Each of the charging stations 320A-320N may include a respective LP wireless device 325A-325N. Each charging station 320A-320N may further be coupled to a respective vehicle. For example, the first charging station 320A may be coupled to a first vehicle 330A, and the second charging stations 320B may be coupled to a second vehicle 330B. The LP wireless devices 325A-325N may be coupled to a respective LP wireless transceiver 335A, 335B of the respective vehicle 330A, 330B. For example, the first LP wireless device 325A may be coupled to the first LP wireless transceiver 335A, and the second LP wireless device 325B may be coupled to the second LP wireless transceiver 335B. Each of the first and second vehicle 330A, 330B may further include a respective first and second control units 340A, 340B. The network device 305 may further be coupled to a server 350 via the external network 345. In some embodiments, the server 350 may further be coupled to the third-party server 255 via the external network 345.

In various embodiments, vehicles 330A, 330B may include, respectively, one or more of a LP wireless transmitter, LP wireless receiver, or LP wireless transceiver 335A, 335B. Accordingly, a LP wireless connection may be established between a respective LP wireless device 325A-325N and a respective LP wireless transmitter, LP wireless receiver, or LP wireless transceiver 335A, 335B. Each control unit 340A, 340B of a respective vehicle 330A, 330B may be configured to transmit authorization information to the respective LP wireless device 325A-325N via the LP wireless connection. As previously described, authorization information may include information that may be used to authorize a user (e.g., driver) to access the desired function. For example, authorization information may include, without limitation, a unique identifier, username, password, PIN, certificate, token, DRM information, biometric information or, other security credential.

In further embodiments, the control unit 340A, 340B may be configured to generate and transmit on-board information about a vehicle. For example, in some embodiments, on-board information may include on-board information (such as vehicle diagnostic information) in addition to or as part of the authorization information. Vehicle diagnostic information may include, without limitation, real-time operating characteristics, vehicle logs (from various control units), on-board diagnostics (OBD) logs and information, sensor logs, and other information about the operation of a vehicle that may be stored and collected, or obtained in real-time. In further embodiments, on-board information may further include identifying information about a driver of the vehicle 335A, 335B or the vehicle 335A, 335B itself. Identifying information may include, without limitation, a vehicle make and model, vehicle identification number (VIN), and customer information associated with the driver (identification information, demographic information, payment information, contact information, etc.).

Accordingly, control units 340A, 340B may include, without limitation, one or more of an electronic control unit (ECU), transmission control unit (TCU), human machine interface(s), battery management systems, telematic control unit, sensor controllers, autonomous control system (e.g., in self driving cars), and other control units found on a respective vehicle 335A, 335B.

In various embodiments, each of the plurality of charging stations 320 may and respective plurality of LP wireless devices 325 may be configured to communicate with a respective vehicle. For purposes of explanation, an example using the first charging station 320A will be described. In one example, a driver of the first vehicle 330A may wish to charge the first vehicle 330A at the first charging station 320A. To initiate the charging process, the first control unit 340A may be configured to transmit, via the first LP wireless transceiver 335A, authorization information, including on-board information, associated with the driver of the first vehicle 330A to the first LP wireless device 325A. The authorization information may be transmitted by the first LP wireless transceiver 335A over the LP wireless connection established with the first LP wireless device 325A. The first LP wireless device 325A may then transmit the authorization information to the server 350, via the network device 305. In some embodiments, the first LP wireless device 325A may transmit the authorization to the network device 305 over the network 315. As previously described with respect to FIG. 2, in some embodiments, the network 315 may be a PLC network. The first LP wireless device 325A may be coupled to a G·hn adapter, which may transmit the authorization information to the G·hn bridge 310. The G·hn bridge 310 may then transmit the authorization information to the network device 305.

In various embodiments, once receive, the network device 305 may transmit the authorization information to the server 350 over the external network 345. As previously described with respect to FIGS. 1 & 2, the server 350, in turn, may be configured to generate an access determination based on the authorization information. For example, in some embodiments, server 350 may be an access control server configured to authenticate the user (e.g., driver), and to determine whether the user is authorized to access the secure function, such as charging the first vehicle 335A at the first charging station 320A. In further embodiments, the server 350 may be configured generate a report, such as a diagnostic report, based on the on-board information. In some embodiments, the diagnostic report may include, without limitation, issues or error codes for the user to review, suggest maintenance or repair, offer suggestions or tips regarding maintenance or driving behavior, or predict errors, failures, or other problems. Accordingly, in some embodiments, the server 350 may include, without limitation, a diagnostic server, access control server, or a combination of both. In various embodiments, the diagnostic report may be generated in addition to, or as part of the access determination.

In some embodiments, the server 350 may further be coupled to the third-party server 355. The server 350 may be configured to obtain, based on the authorization information, one or more offers from the third-party server. In some examples, the server 350 may obtain one or more offers, relevant to the user, from the third-party server 355. In further embodiments, the server 350 may share information about the user, obtained from the authorization information (including on-board information), or the on-board information itself with the third-party server 355. The server 350 may receive, from the third-party server 355, one or more offers based on the information associated with the user. The one or more offers may include offers third-party retailers and businesses, in which the offers are determined to be relevant to the user and/or vehicle 335A. For example, if it is determined that the first vehicle 335A is due for an oil change, one or more offers for an oil change may be obtained by the server 350. Other offers, by way of example, may include, without limitation, offers for tires or tire repair, offers from mechanics or different repair shops, offers from car dealerships, restaurants, lodging, nearby attractions, among others. In some embodiments, the one or more offers may be included in addition to, or as part of the access determination.

Accordingly, in various embodiments, the server 350 may be configured to transmit one or more of the access determination, diagnostic report, one or more offers, or a combination of the above to the appropriate LP wireless device 325A-325N via the network device 305. The server 350 may transmit the access determination, diagnostic report, and/or one or more offers to the network device 305 over the external network 345. The network device 305 may then transmit the access determination, diagnostic report, and/or one or more offers to the appropriate LP wireless device 325A-325N (in this example the first LP wireless device 325A). The first LP wireless device 325A may then be configured to cause the first charging station 320A to begin charging the first vehicle 335A, or to deny the charging operation, based on the access determination. In some embodiments, the first LP wireless device 325A may further be configured to adjust operation of the charging stations 320A based on the diagnostic report. For example, the diagnostic report may indicate that a health of a battery of the first vehicle 335A being charged. In response, the first LP wireless device 325A may modify a rate at which the first vehicle 335A is charged. For example, the first LP wireless device 325A may allow faster charging of a vehicle by providing more power to a healthy but drained battery. For an unhealthy or damaged battery, the charging may be slowed by providing less power and/or halted altogether. In yet further embodiments, the LP wireless device 325A may be configured to transmit one or more of the diagnostic report and one or more offers to the first control unit 340A. The first control unit 340A may then present the diagnostic report and/or one or more offers to the driver of the vehicle. Alternatively, the charging station 320A may further include a display device (not shown). The first LP wireless device 325A may be configured to cause the display device to display the diagnostic report and/or one or more offers to the driver of the first vehicle 335A. Accordingly, in various embodiments, the secure functions of the first charging station 320A that may be accessed or controlled, based on the access determination, may include, without limitation, charging a vehicle, changing the charging characteristics for the vehicle, obtaining a diagnostic report, and/or obtaining one or more third-party offers. In various embodiments, similar functionality may be provided at each respective charging station 320A-320N, such as the second charging station 320B, for a respective vehicle and driver, such as the second vehicle 335B.

As described with respect to FIGS. 1-3, by utilizing LP wireless devices and LP wireless connections for access control, flexibility is provided to the types of devices to which access control may be provided. For example, utilizing a standalone LP wireless device programmed to interface with a desired secure device, access control functionality may be added to various types of devices. Moreover, LP wireless devices and connection provide flexibility to the types of topologies that may be utilized in implementing access control solutions. For example, in some embodiments, due to the low-power requirements of LP connections, battery powered or power sensitive applications for LP wireless devices may be realized. For example, battery powered LP wireless devices may be utilized to add access control functionality to remote areas that may be removed from other power sources. In further aspects, by utilizing a remotely located access control server (such as server 125, 280, 350), more control and flexibility may be provided over the way authorized users may be registered and authorized, as well as control over how and what secure functions may be accessed by a specific user.

Figure 4:
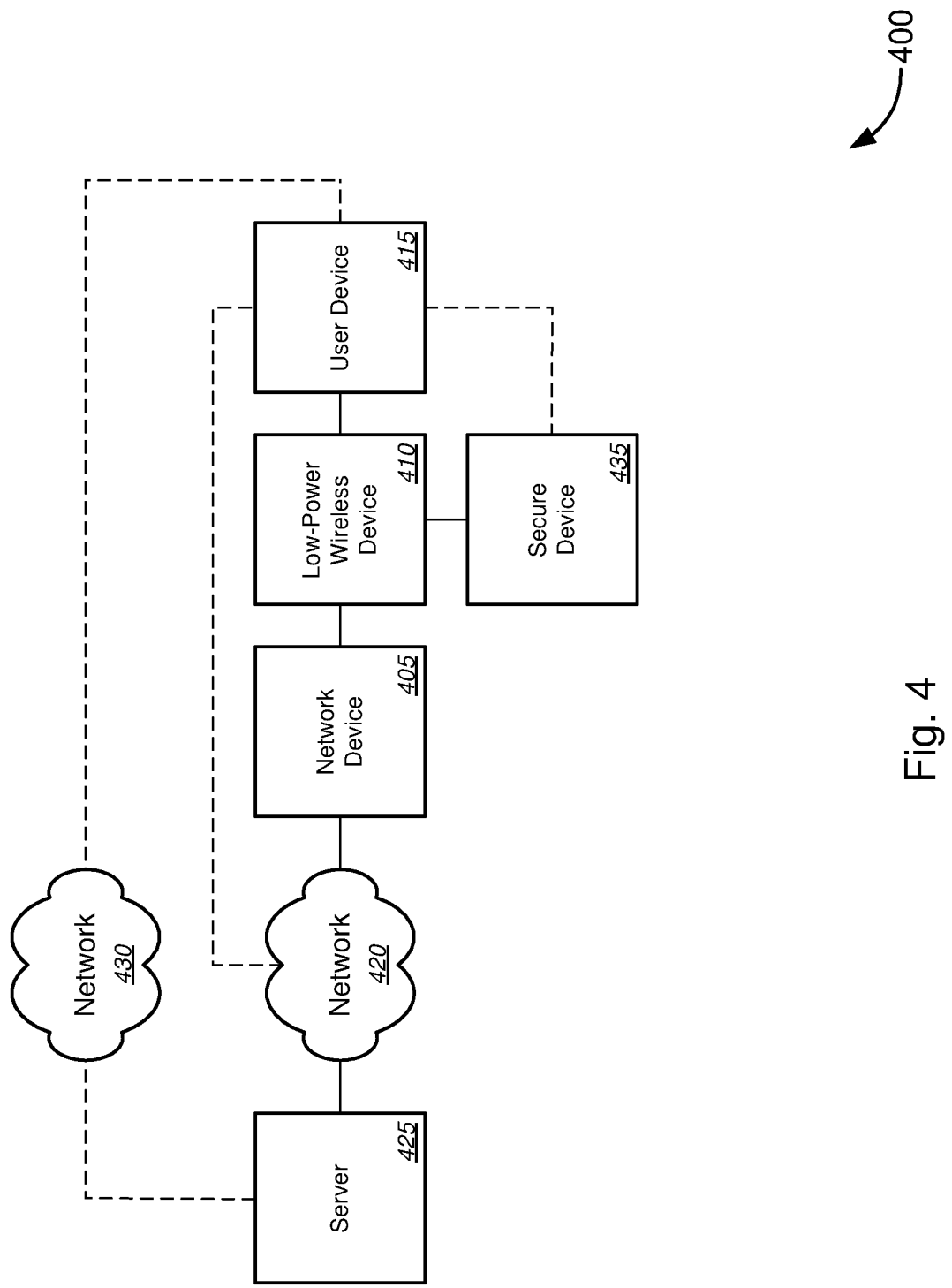
FIG. 4 is a schematic block diagram of a system for secondary authorizations for a low-power wireless access control environment, in accordance with various embodiments.

FIG. 4 is a schematic block diagram of a system 400 for implementing secondary authorizations for a low-power wireless access control context, in accordance with various embodiments. The system 400 includes a network device 420, LP wireless device 410, user device 415, a first network 420, server 425, a second network 430, and secure device 435. It should be noted that the various components of the system 400 are schematically illustrated in FIG. 4, and that modifications to the system 400 may be possible in accordance with various embodiments.

The system 400 depicts one example configuration for implementing secondary authorizations, as previously discussed with respect to FIG. 1. In various embodiments, the network device 405 may be coupled to the LP wireless device 410. The LP wireless device 410 may be coupled to the user device 415, and the secure device 435. The network device 405 may further be coupled to a server 425 via an external network 420. The user device 415 may also be coupled to the server 425 via a second network 430.

In some embodiments, as previously described with respect to FIGS. 1-3, a LP wireless connection may be established between the LP wireless device 410 and user device 415. The LP wireless device 410 may transmit authorization information from the user device 415 to the server 425, which may in turn make an access determination based on the authorization information. In some embodiments, in response to a determination that the user and/or user device 415 is authorized to access a secure function of the secure device 435, the server 425 may further be configured to generate a secondary authorization request. In some embodiments, the server 425 may be configured to send the secondary authorization request directly to the user device 425, via the second network 430. In some examples, the user device 415 may be a mobile phone coupled to a cellular provider network 430. Accordingly, the server 425 may be configured to transmit, via the cellular provider network 430, the secondary authorization request. The secondary authorization, for example, may include an SMS, MMS, voice call, video call, or an app-based notification, requesting secondary authorization from the user device 415. In other embodiments, the user device 415 may also be coupled to the first network device 420. Thus, the server 425 may may transmit the secondary authorization request to the user device 415 via the network 420, or alternatively the network device 405.

In various embodiments, the user device 415 may then be configured to generate and transmit a secondary authorization confirmation. The secondary authorization confirmation may be a response to the secondary authorization confirmation. The secondary authorization confirmation may be an indication, from a user associated with the user device, of whether a request to access the secure function is a valid request originating from the user that should be allowed, or conversely an invalid request not originating from the user that should be prevented. Thus, for example, if a user wishes to proceed to gain access to the secure function, a secondary authorization confirmation may be generated to confirm that the request is valid. If the user does not recognize the request to access the secure function, a secondary authorization confirmation may be generated to confirm that the request is invalid and should not be approved. If the secondary authorization confirmation indicates that the request is invalid, the server 425 may modify the access determination to prevent or cancel access to the secure function of the secure device 435.

Figure 5:
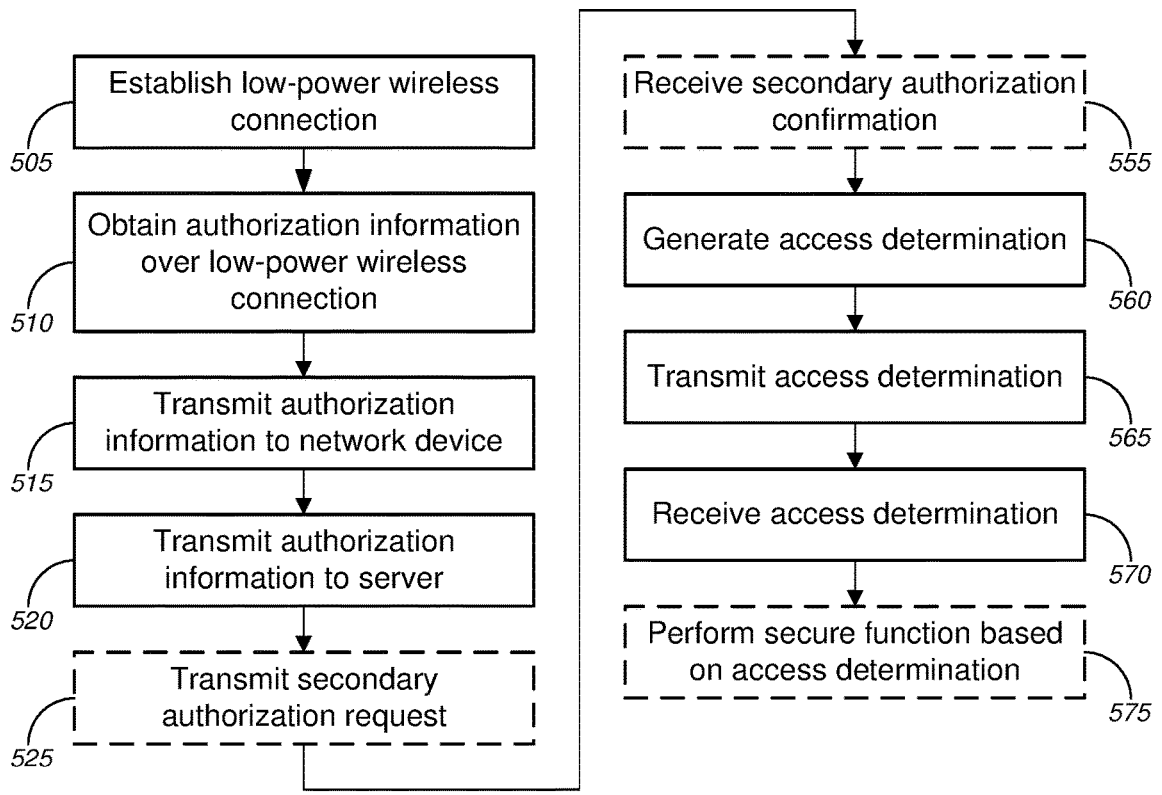
FIG. 5 is a flow diagram of a method for access control and authorization, in accordance with various embodiments.

FIG. 5 is a flow diagram of a method 500 for access control and authorization, in accordance with various embodiments. The method 500 begins, at block 505, by establishing a LP wireless connection between an LP wireless device and a user device. At block 510, authorization information may be obtained by the LP wireless device from the user device over the LP wireless connection. In some embodiments, the LP wireless device may request authorization information from a user device. Alternatively, the user device may transmit the authorization information to the LP wireless device.

The method 500 continues, at block 515, by transmitting, via the LP wireless device, the authorization information to a network device. In various embodiments, the network device may include, without limitation, a residential gateway, modem, router, access point, network bridge, switch, hub, or repeater through which an LP wireless device may be coupled to an external network. At block 520, the network device may further transmit the authorization information to a server. In various embodiments, the server may include an access control server, authentication server, authorization server, DRM server, application server, or diagnostic server. The server may be configured to generate an access determination, based on the authorization information, indicative of whether the user device is authorized to access a secure function of a secure device.

At optional block 525, the server may transmit a secondary authorization request to a user device. In some embodiments, the secondary authorization request may be transmitted to the user device, or an account or different device associated with the user of the user device. In various embodiments, the secondary authorization request may be generated and transmitted concurrently with, prior to, or after generating an access determination. At optional block 555, the server may be configured to receive a secondary authorization confirmation from the user device, account associated with the user, or a different device from the user device associated with the user.

The method 500 continues, at block 560, by generating an access determination. In various embodiments, the server may be configured to generate an access determination for a user and/or user device based on the authorization information. In further embodiments, the server may further be configured to generate and/or modify the access determination based on the secondary authorization confirmation, as previously described.

At block 565, the server may be configured to transmit the access determination to the LP wireless device via a network device. In various embodiments, the network device may be configured to receive the access determination from the server via the external network. The network device may then transmit the access determination to an appropriate LP wireless device.

At block 570, the LP wireless device may then receive the access determination, from the server, via the network device. In various embodiments, the LP wireless device may receive the access determination from the network device, and determine, based on the access determination, whether to grant access to a secure function of the secure device. At optional block 575, the LP wireless device may cause a secure function to be performed based on the access determination. For example, in some embodiments, the access determination may indicate that access should be granted and the secure function performed. Accordingly, in some embodiments, the LP wireless device may be configured to cause the secure device to perform one or more secure functions.

Figure 6:
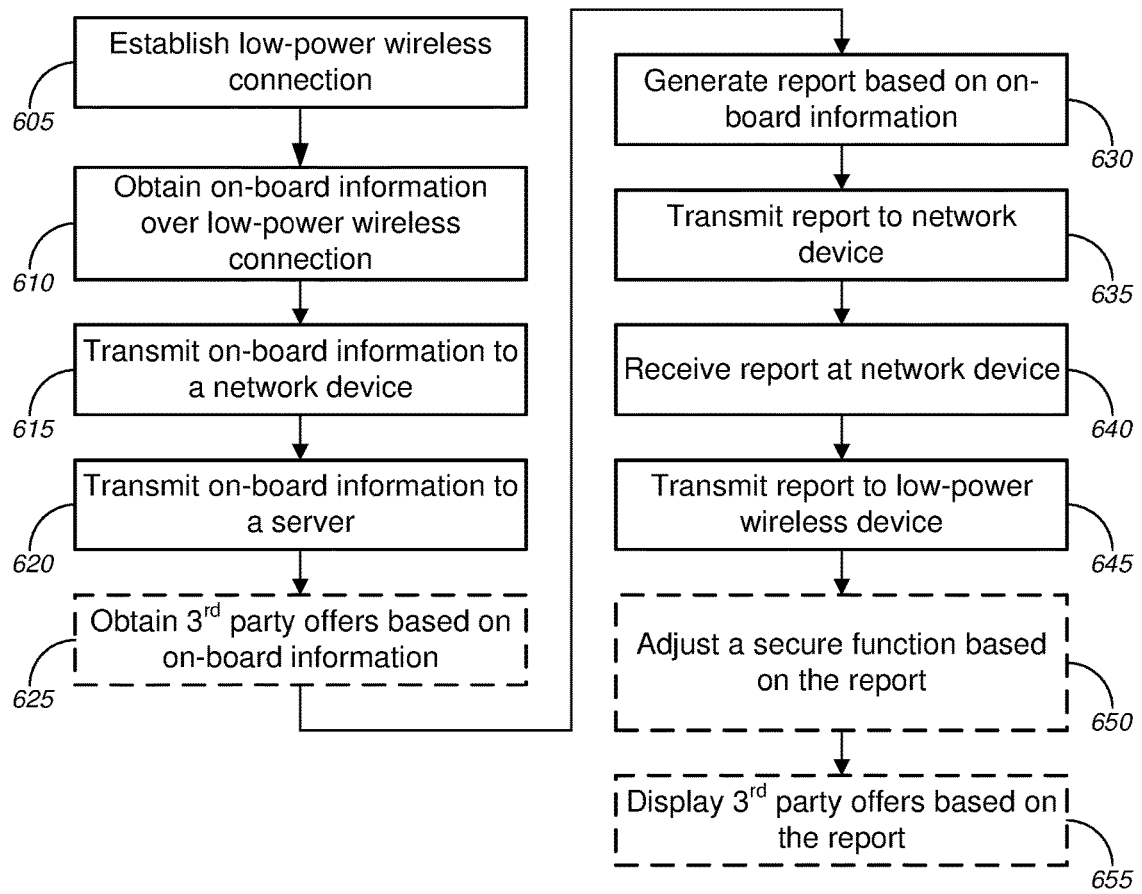
FIG. 6 is a flow diagram of a method for obtaining vehicle diagnostics and reports, in accordance with various embodiments.

FIG. 6 is a flow diagram of a method 600 for obtaining vehicle diagnostics and reports, in accordance with various embodiments. The method 600 begins, at block 605, by establishing a low-power wireless connection between a charging station and a vehicle. In various embodiments, the charging station may include an LP wireless device coupled to a network device. The vehicle may include an LP wireless transceiver coupled to a control unit of the vehicle. The LP wireless transceiver may be configured to communicate with the LP wireless device via the LP wireless connection.

At block 610, the method 600 continues by obtaining on-board information over the LP wireless connection. In various embodiments, the LP wireless device may obtain the on-board information from the control unit of the vehicle, via the LP wireless connection. Accordingly, the control unit may be configured transmit the on-board information to the LP wireless device via an LP wireless transceiver. In some embodiments, the on-board information may be transmitted as part of, or alternatively, in addition to authorization information. The on-board information may include, without limitation, vehicle diagnostic information, real-time operating characteristics, vehicle logs (from various control units), on-board diagnostics (OBD) logs and information, sensor logs, and other information about the operation of a vehicle that may be stored and collected, or obtained in real-time.

At block 615, the on-board information may be transmitted, by the LP wireless device, to a network device. The network device, at block 620, may then transmit the on-board information to a server via an external network. In various embodiments, the server may include, without limitation, a diagnostic server. The diagnostic server may be configured to receive and analyze the on-board information about a vehicle. In some embodiments, the server may further be in communication with one or more third-party servers and configured to obtain one or more offers from the one or more third-party servers. Accordingly, at optional block 625, the method 600 may continue by obtaining, with the server, third-party offers based on the on-board information. For example, in some embodiments, the server may be configured to obtain one or more offers, relevant to the user, from one or more third-party servers based on the on-board information. The one or more third-party offers may include offers from third-party retailers and businesses.

At block 630, the method 600 continues with the server generating a report based on the on-board information. In various embodiments, the report may include a diagnostic report. In further embodiments, the report may further include, without limitation, one or more third-party offers, maintenance suggestions, repair suggestions, driving style or behavioral change suggestions.

At block 635, the report may then be transmitted, by the server, to the network device via the external network. At block 640, the report may be received by the network device and transmitted, at block 645, to the LP wireless device. In some embodiments, based on the report, at optional block 650, the LP wireless device may adjust a secure function based on the report. For example, in some embodiments, the secure function may be charging a vehicle at the charging station. The LP wireless device may then adjust a rate at which the charging station charges the vehicle based, at least in part, on the report. At optional block 655, the method 600 may further include displaying the third-party offers based on the report. For example, in some embodiments, the one or more third-party offers may be transmitted to the vehicle or a control unit of the vehicle to be displayed in the vehicle cabin. Alternatively, in some embodiments, the charging station may further include a display device. The LP wireless device may be configured to cause the one or more third-party offers to be displayed on the display device of the charging station.

Figure 7:
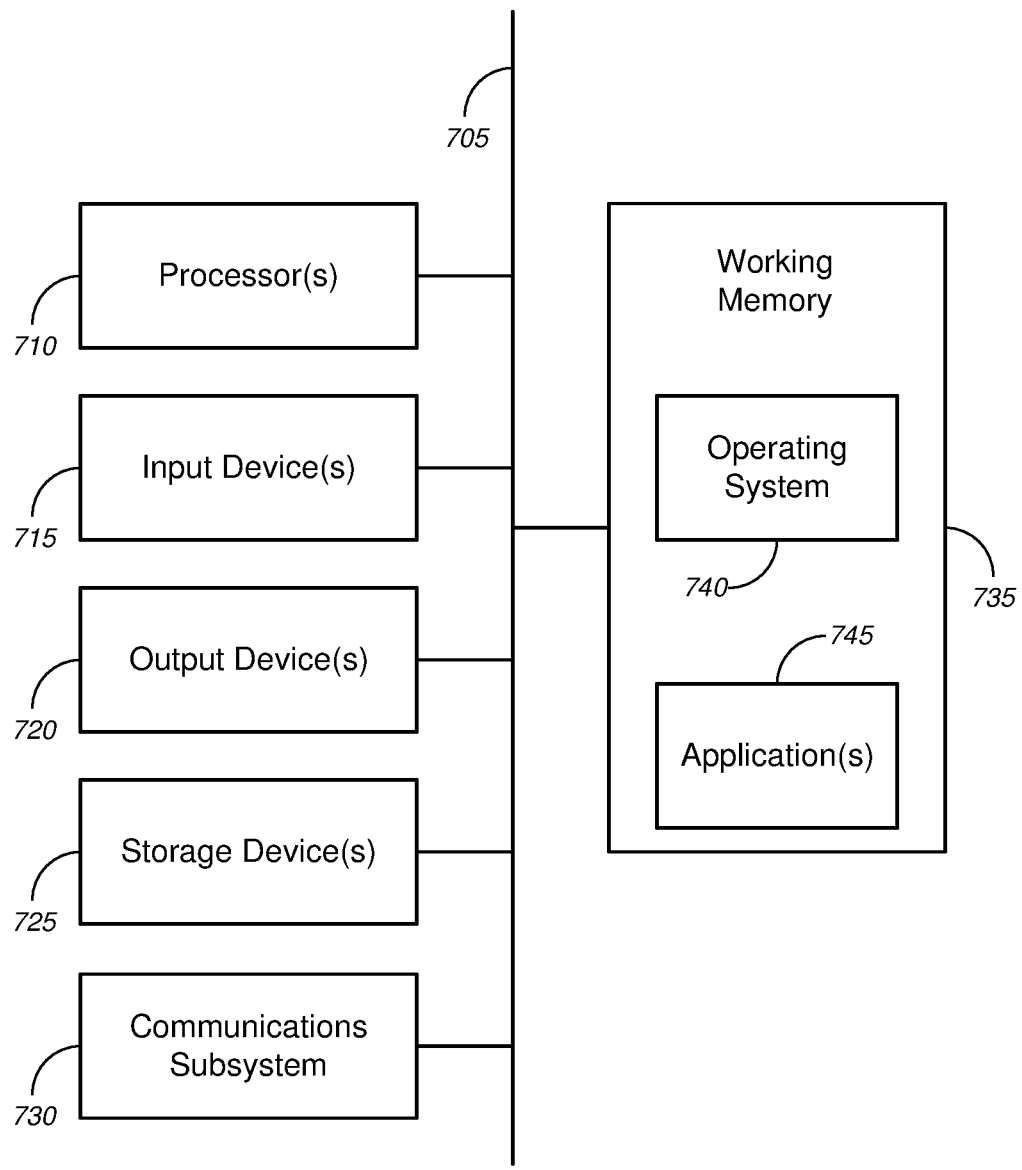
FIG. 7 is a schematic block diagram of a computer system for entertainment device communication with printing devices, in accordance with various embodiments.

FIG. 7 is a schematic block diagram of a computer system 700 for entertainment device communication with printing devices, in accordance with various embodiments. FIG. 7 provides a schematic illustration of one embodiment of a computer system 700, such as the LP wireless device, user device, secure device, server, or control unit, which may perform the methods provided by various other embodiments, as described herein. It should be noted that FIG. 7 only provides a generalized illustration of various components, of which one or more of each may be utilized as appropriate. FIG. 7, therefore, broadly illustrates how individual system elements may be implemented in a relatively separated or relatively more integrated manner.

The computer system 700 includes multiple hardware elements that may be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and microcontrollers); one or more input devices 715, which include, without limitation, a mouse, a keyboard, one or more sensors, and/or the like; and one or more output devices 720, which can include, without limitation, a display device, and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 700 might also include a communications subsystem 730, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, cellular communication facilities, etc.), and/or a LP wireless device as previously described. The communications subsystem 730 may permit data to be exchanged with a network (such as the network described below, to name one example), with other computer or hardware systems, between data centers or different cloud platforms, and/or with any other devices described herein. In many embodiments, the computer system 700 further comprises a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments (including, without limitation, various applications running on the various server, LP wireless device, control units, and various secure devices as described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally receives the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a storage device 725 either before or after execution by the processor(s) 710.

Figure 8:
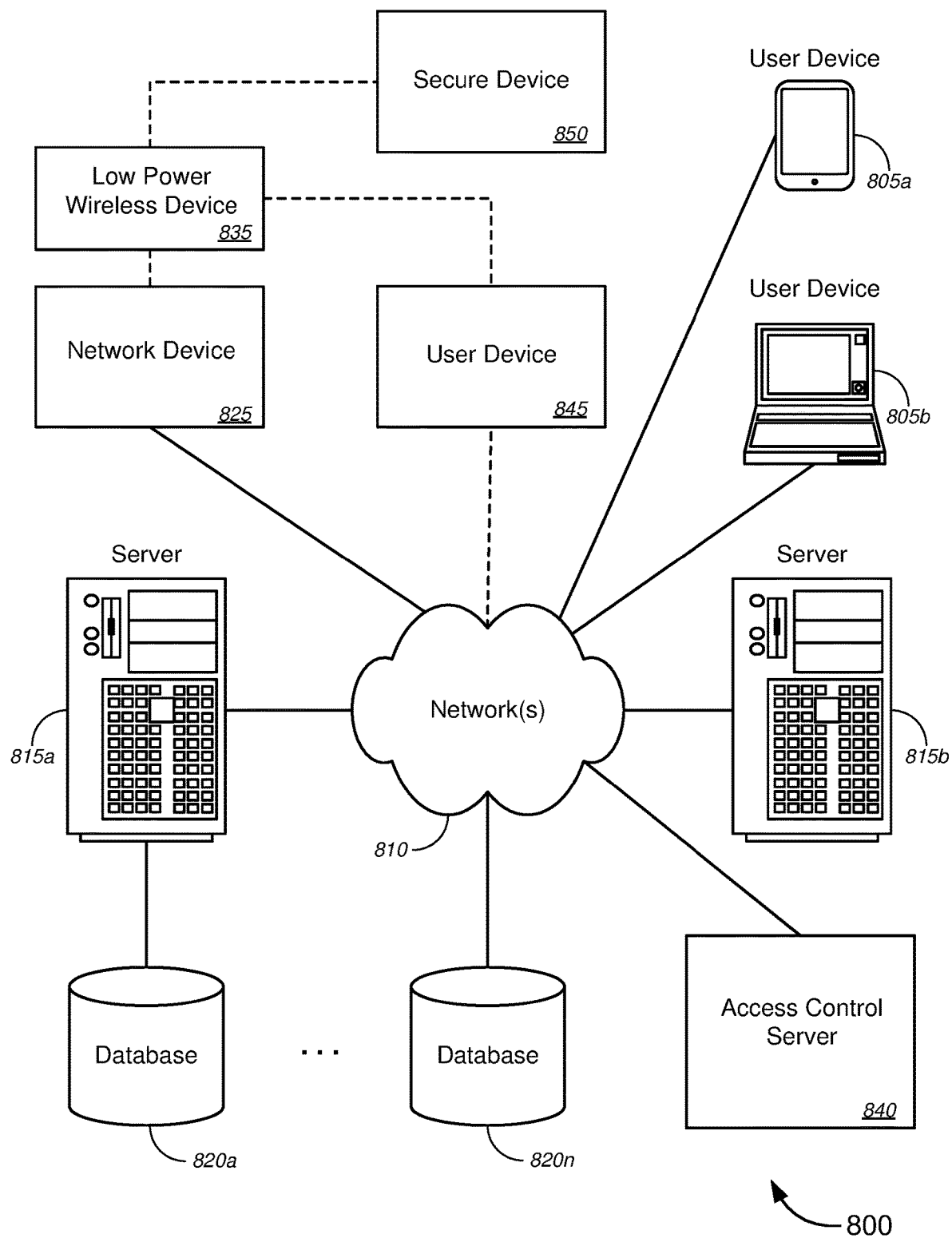
FIG. 8 is a block diagram illustrating a networked system of computing systems, which may be used in accordance with various embodiments.

FIG. 8 is a block diagram illustrating a networked system 800 of computing systems, which may be used in accordance with various embodiments. The system 800 may include one or more user devices 805. A user device 805 may include, merely by way of example, desktop computers, single-board computers, tablet computers, laptop computers, handheld computers, and the like, running an appropriate operating system, which in various embodiments may include an AI engine and/or learning API as previously described. User devices 805 may further include cloud computing devices, IoT devices, servers, and/or workstation computers running any of a variety of operating systems. In some embodiments, the operating systems may include commercially-available UNIX™ or UNIX-like operating systems. A user device 805 may also have any of a variety of applications, including one or more applications configured to perform methods provided by various embodiments, as well as one or more office applications, database client and/or server applications, and/or web browser applications. Alternatively, a user device 805 may include any other electronic device, such as a thin-client computer, Internet-enabled mobile telephone, and/or personal digital assistant, capable of communicating via a network (e.g., the network(s) 810 described below) and/or of displaying and navigating web pages or other types of electronic documents. Although the exemplary system 800 is shown with two user devices 805, any number of user devices 805 may be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™ IPX™, AppleTalk™, and the like. Merely by way of example, the network(s) 810 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications, programs, web-based services, or other network resources accessible by a client. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805 and/or server 815.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a (or alternatively, user device 805). Alternatively, a database 820n can be remote from any or all of the computers 805, 815, 825, 835 so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815, 825, 835 can be stored locally on the respective computer and/or remotely, as appropriate.) In one set of embodiments, the database 820 may be a relational database configured to host one or more data lakes collected from various data sources, such as the managed object 825, user devices 805, or other sources. Relational databases may include, for example, an Oracle database, that is adapted to store, update, and retrieve data in response to SQL-formatted commands. The database might be controlled and/or maintained by a database server.

The system 800 may further include a user device 845 coupled to a LP wireless device 835. The user device 845 and LP wireless device 835 may be configured to establish a LP wireless connection. The LP wireless device 835 may then be configured to receive, over the LP wireless connection, authorization information from the user device 845. The LP wireless device 835 may be coupled to a network device 825, through which the LP wireless device 835 may access the network 810. The network device 825 may then transmit the authorization information to one or more of the access control server 840, or servers 815a-815b. The access control server 840 may be configured to generate an access determination. The access control server 840 may be configured to then transmit the access determination to the network device 825 via the network 810. The network device 825 may then transmit the access determination to the LP wireless device 835. The LP wireless device 835 may be configured to grant or deny access to a secure function (e.g., perform a secure function, modify a secure function, control a secure device 850) of the secure device 850 based on the access determination.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
    a wireless charging station configured to charge a vehicle, the wireless charging station including a low-power wireless device;
    a diagnostic server;
    a network device in communication with the diagnostic server;
    wherein the low-power wireless device is coupled to the network device, and an on-board low-power wireless transceiver of the vehicle is coupled to an on-board computer of the vehicle,
    wherein the low-power wireless device comprises:
        a low-power wireless transceiver configured to communicate with the on-board low-power wireless transceiver of the vehicle;
        a processor;
        non-transitory computer readable media comprising instructions executable by the processor to:
            establish, via the low-power wireless transceiver, a low-power wireless connection with the on-board low-power wireless transceiver of the vehicle, wherein the low-power wireless connection is configured to utilize a low-power wireless communication protocol;
            obtain, via the low-power wireless connection, on-board information associated with the vehicle from the on-board computer of the vehicle;
            transmit, via the network device, the on-board information to the diagnostic server;
            receive, via the network device, a report from the diagnostic server based on the on-board information; and
            adjust, via the low-power wireless device, a charging characteristic of a wireless charger based on at least one of the on-board information or the report.

2. The system of claim 1, wherein the diagnostic server is configured to receive, from the low-power wireless device, the on-board information; generate the report based on the on-board information; and transmit the report to the low-power wireless device.

3. The system of claim 1, network device is a router, switch, or modem coupled to the low-power wireless device via a communication network.

4. The system of claim 3, wherein the communication network is a low-power wireless area network.

5. The system of claim 3, wherein the communication network a powerline communication network.

6. The system of claim 3, wherein the diagnostic server is remotely accessible by the network device via an external network separate from the communication network through which the network device is coupled to the low-power wireless device.

7. The system of claim 1, wherein the wireless charging station further comprises a wireless charger configured to wirelessly charge a battery of the vehicle, wherein the instructions are further executable by the processor to:
    adjust a charging characteristic of the wireless charger based, at least in part, on one of the on-board information or the report.

8. The system of claim 1, wherein the on-board information includes one or more of diagnostic information, vehicle make and model, vehicle identification number, customer information for a user associated with the vehicle, payment information, and authorization information associated with the user.

9. The system of claim 8, wherein the report includes one or more of a diagnostic report, targeted offerings, and invoices or receipts.

10. An apparatus comprising:
    a low-power wireless transceiver configured to communicate with an on-board control unit of a vehicle over a low-power wireless connection, wherein the low-power wireless connection is configured to utilize a low-power wireless communication protocol;
    a processor;
    non-transitory computer readable media comprising instructions executable by the processor to:
        establish, via the low-power wireless transceiver, the low-power wireless connection with the on-board control unit;
        obtain, via the low-power wireless connection, on-board information associated with the vehicle from the on-board control unit;
        transmit, via a network device, the on-board information to a diagnostic server;
        receive, via the network device, a report from the diagnostic server based on the on-board information;
        provide, via the low-power wireless transceiver, the report to be displayed; and
        adjust a charging characteristic of a wireless charger based on at least one of the on-board information or the report.

11. The apparatus of claim 10, wherein the report includes, wherein the instructions are further executable by the processor to:

establish, via a first communication network, a second connection to the network device, wherein the network device is coupled to the diagnostic server via a second communication network.

12. The apparatus of claim 11, wherein the first communication network is a powerline communication network.

13. The apparatus of claim 11, wherein the first communication network is a low-power wireless area network.

14. The apparatus of claim 10, wherein the instructions are further executable by the processor to:
receive, via the on-board control unit, on-board information associated with a user; and
adjust a charging characteristic of a wireless charger charging the vehicle based, at least in part, on one of the on-board information or the report.

15. The apparatus of claim 10, wherein the on-board information includes one or more of diagnostic information, vehicle make and model, vehicle identification number, customer information for a user associated with the vehicle, payment information, and authorization information associated with the user.

16. The apparatus of claim 10, wherein the instructions are further executable by the processor to:
provide, via the low-power wireless transceiver, one or more of a diagnostic report, targeted offerings, and invoices or receipts, based on at least one of the on-board information or the report.

17. A method comprising:
establishing, via a low-power wireless device, a low-power wireless connection with an on-board control unit of a vehicle, wherein the low-power wireless connection is configured to utilize a low-power wireless communication protocol;
obtaining, via the low-power wireless device, on-board information associated with the vehicle, from the on-board control unit, over the low-power wireless connection;
transmitting, via the low-power wireless device, on-board information to a network device;
transmitting, via the network device, the on-board information to a diagnostic server;
receiving, via the network device, a report from the diagnostic server based on the on-board information; and
adjusting, via the low-power wireless device, a charging characteristic of a wireless charger based on at least one of the on-board information or the report.

18. The method of claim 17 further comprising:
receiving, via an access control server and from the low-power wireless device, the authorization information;
determining, via the access control server, whether the user of the mobile device is an authorized user; and
transmitting, via the access control server, the access authorization to the low-power wireless device.

19. The method of claim 17 further comprising:
establishing, with the low-power wireless device, a second connection to the network device via a first communication network, wherein the network device is coupled to the diagnostic server via a second communication network different from the first.

20. The method of claim 17 further comprising:
providing, via the low-power wireless transceiver, one or more of a diagnostic report, targeted offerings, and invoices or receipts, based on the report.

* * * * *